US012195342B2

(12) United States Patent
Luo

(10) Patent No.: US 12,195,342 B2
(45) Date of Patent: Jan. 14, 2025

(54) TREATMENT PROCESS FOR RECYCLING SILICON INGOT CUTTING WASTE

(71) Applicant: Rosi, Grenoble (FR)

(72) Inventor: Yun Luo, Schupfen (CH)

(73) Assignee: ROSI, Grenoble (FR)

( * ) Notice: Subject to any disclaimer, the term of this patent is extended or adjusted under 35 U.S.C. 154(b) by 961 days.

(21) Appl. No.: 17/256,816

(22) PCT Filed: Jun. 13, 2019

(86) PCT No.: PCT/FR2019/051422
§ 371 (c)(1),
(2) Date: Mar. 31, 2021

(87) PCT Pub. No.: WO2019/239067
PCT Pub. Date: Dec. 19, 2019

(65) Prior Publication Data
US 2021/0253435 A1    Aug. 19, 2021

(30) Foreign Application Priority Data

Jun. 14, 2018 (FR) ..................... 1855202

(51) Int. Cl.
C01B 33/037    (2006.01)
B01D 21/00    (2006.01)
(Continued)

(52) U.S. Cl.
CPC ........ *C01B 33/037* (2013.01); *B01D 21/0012* (2013.01); *B01D 21/262* (2013.01);
(Continued)

(58) Field of Classification Search
None
See application file for complete search history.

(56) References Cited

U.S. PATENT DOCUMENTS

2011/0081289 A1*   4/2011   Kim .................... C01B 33/037
                                                                      423/349
2011/0147979 A1    6/2011   Fragiacomo
2017/0197842 A1*   7/2017   Yeh ......................... C01B 3/06

FOREIGN PATENT DOCUMENTS

CN    101683961 A    3/2010
CN    101683981 A    3/2010
(Continued)

OTHER PUBLICATIONS

International Search Report from International Application No. PCT/FR2019/051422, mailed Aug. 6, 2019, 6 pages.
(Continued)

*Primary Examiner* — Sheng H Davis
(74) *Attorney, Agent, or Firm* — TraskBritt

(57) ABSTRACT

A treatment method for purifying silicon microparticles contained in waste resulting from the cutting of ingots with a diamond wire comprises: a) providing a contaminated slurry, resulting from the waste, formed by an aqueous mixture comprising the silicon microparticles, organic species and metal contaminants; b) adding a dilute hydrogen peroxide solution to the contaminated slurry, in order to form a first mixture, and stirring the first mixture; c) solid/liquid separation of the first mixture in order to obtain, on the one hand, a first purified slurry and, on the other hand, a first liquid loaded with organic species and metal contaminants.

21 Claims, 2 Drawing Sheets

(51) Int. Cl.
*B01D 21/26* (2006.01)
*B28D 7/02* (2006.01)
*C02F 11/121* (2019.01)
*C02F 11/13* (2019.01)
*C02F 103/16* (2006.01)

(52) U.S. Cl.
CPC ............ *B01D 21/267* (2013.01); *B28D 7/02* (2013.01); *C02F 11/121* (2013.01); *C02F 11/13* (2019.01); *C02F 2103/16* (2013.01)

(56) References Cited

FOREIGN PATENT DOCUMENTS

| | | | |
|---|---|---|---|
| CN | 102642835 A | | 8/2012 |
| CN | 102815700 | * | 12/2012 |
| CN | 103373731 B | | 7/2015 |
| CN | 107416838 | * | 12/2017 |
| JP | 05-033070 A | | 2/1993 |
| JP | 2011-527279 A | | 10/2011 |
| JP | 2012-514349 A | | 6/2012 |
| JP | 2013-189318 A | | 9/2013 |
| JP | 2014-019603 A | | 2/2014 |
| JP | 2015-199619 A | | 11/2015 |
| WO | 2009081725 | * | 2/2009 |
| WO | 2009/081725 A1 | | 7/2009 |
| WO | 2010/003456 A1 | | 1/2010 |
| WO | 2012/125942 A1 | | 9/2012 |
| WO | 2016/171018 A1 | | 10/2016 |

OTHER PUBLICATIONS

International Written Opinion from International Application No. PCT/FR2019/051422, mailed Aug. 6, 2019, 7 pages.
Japanese Notice of Reasons for Rejections for Application No. P2020-569750 dated Apr. 25, 2023, 6 pages.
Chinese Office Action for Application No. 201980051759.3 dated Mar. 1, 2023, 7 pages.
French Search Report for Application No. 1855202 dated Dec. 3, 2018, 2 pages.
Japanese Decision to Grant a Patent for Japanese Application No. 2020-569750, dated Sep. 26, 2023, 5 pages with English translation.

* cited by examiner

TREATMENT PROCESS FOR RECYCLING SILICON INGOT CUTTING WASTE

CROSS-REFERENCE TO RELATED APPLICATIONS

This application is a national phase entry under 35 U.S.C. § 371 of International Patent Application PCT/FR2019/051422, filed Jun. 13, 2019, designating the United States of America and published as International Patent Publication WO 2019/239067 A1 on Dec. 19, 2019, which claims the benefit under Article 8 of the Patent Cooperation Treaty to French Patent Application Serial No. 1855202, filed Jun. 14, 2018.

TECHNICAL FIELD

The present disclosure relates to the silicon production line for the photovoltaic industry. It relates, in particular, to a treatment method for recycling the waste resulting from the cutting of silicon ingots ("kerf").

BACKGROUND

Today, silicon wafers, intended for the semiconductor or photovoltaic industry, are made from silicon ingots, essentially using diamond wire cutting methods. These methods have gradually supplanted slurry sawing, because they provide a better quality of wafers at a lower production cost.

The width of the diamond wires being of the same order of magnitude as the thickness of the cut wafers, these sawing methods nevertheless generate a significant amount of silicon waste: up to 40 to 50% of the total mass of an ingot. This waste takes the form of very fine powder (silicon microparticles whose surface is oxidized), mixed with liquid additives, metal contaminants and organic or inorganic species.

The silicon powder, properly extracted from this mixture and purified, could be of great value for reuse in different industries, including photovoltaic, energy storage, ceramic synthesis, etc. An efficient purification of this silicon powder must, in particular, fulfill the following three objectives:

Reduction of Organic Species:

These species come from organic (liquid) additives used in the sawing method or from polymeric compounds contained, for example, in the diamond wires or in the saws. The presence of residues of organic species in the silicon powder reduces the possibilities for reuse thereof; in fact, in most cases, the silicon must undergo high-temperature treatments, during which the organic species will be liable to create SiC particles, which are unfavorable for the majority of applications.

Reduction of Metal Contaminants:

These contaminants come mainly from diamond wires of a metallic nature. They can exist in different forms: ionic, atomic, particulate, and they may be found dispersed in the mixture or bound to the surface of the silicon microparticles. The presence of residues of metal contaminants in the silicon powder negatively affects the performance of the developed devices, in particular, in semiconductor and photovoltaic applications.

Reduction of Silicon Oxide:

The surface of the silicon microparticles comprises a layer of silicon oxide, which may hinder their reuse in some cases.

Several methods are proposed in the state of the art for extracting and purifying the silicon microparticles obtained from cutting waste ("kerf"), in particular, described in documents WO2012125942, WO2010003456, CN103373731.

Document WO2012125942 proposes a method using ozone to remove organic species, hydrochloric acid to dissolve metal contaminants and hydrofluoric acid to remove the silicon oxide layer. The main drawbacks of this method lie in the limited efficiency of ozone due to its low solubility in water, and in the use of concentrated acids.

Document WO2010003456 also uses concentrated acids, which are liable to pollute the environment and generate high process costs.

Document CN103373731 proposes a method based on the oxidation of the silicon powder by a strong oxidant, followed by the extraction of the oxidized powder by an organic solvent. The drawbacks of this method lie in the use of chemical substances that pollute the environment such as organic solvent and acid to deoxidize the silicon powder. The loss of part of the silicon during the method (due to its oxidation) is also significant.

Other methods offer sequences of successive treatments with strong bases and with strong acids, according to methods conventionally implemented to clean silicon (RCA clean). Unfortunately, these cleanings, which are very effective on silicon wafers, do not make it possible to achieve the level of purification that is required in the case of silicon microparticles dispersed in a contaminated aqueous mixture.

BRIEF SUMMARY

The present disclosure aims to overcome all or some of the aforementioned drawbacks. The present disclosure relates to a treatment method for recycling silicon ingot cutting waste ("kerf"), by sawing with diamond wires, without abrasive.

The present disclosure relates to a treatment method for purifying silicon microparticles contained in waste resulting from the cutting of ingots with diamond wires, without abrasive, comprising:

a) providing a contaminated slurry, resulting from the waste, formed by an aqueous mixture comprising the silicon microparticles, organic species and metal contaminants;

b) adding a dilute hydrogen peroxide solution to the contaminated slurry, in order to form a first mixture consisting of the contaminated slurry, hydrogen peroxide and water, and stirring the first mixture;

c) performing the solid/liquid separation of the first mixture in order to obtain, on the one hand, a first purified slurry and, on the other hand, a first liquid loaded with organic species and metal contaminants.

According to other advantageous and non-limiting features of the present disclosure, taken alone or in any technically feasible combination:

in step a), the contaminated slurry is obtained from the waste, by a solid/liquid separation technique chosen from sedimentation, centrifugation, cyclonic separation or filtration, and the contaminated slurry contains about 50% solid matter and 50% liquid matter, in weight percentages;

in step b), the dilute hydrogen peroxide solution has a mass concentration of between 1% and 35%;

step b) comprises adding pure water to the first mixture, so that the first mixture comprises between 5 and 10% solid matter, in weight percentage;

step b) is carried out at a temperature between 20° C. and 95° C., for a period ranging from 10 minutes to 5 hours;

the solid/liquid separation of step c) is carried out by a technique chosen from filtration, sedimentation, centrifugation or cyclonic separation, and in which the first purified slurry comprises at least 40% solid matter, in weight percentage;

the treatment method comprises, after step c), a step c') during which the following is carried out:
adding pure water to the first purified slurry to form a second mixture,
performing the solid/liquid separation of the second mixture to obtain, on the one hand, a second purified slurry and, on the other hand, a second liquid containing organic species and metal contaminants.

stirring is applied to the second mixture;

step c') is repeated one to five times;

the treatment method comprises, after step c), a step c") during which the following is carried out:
providing the first purified slurry, kept in the form of a filter cake,
circulating a dilute hydrofluoric acid solution between 0.1% and 1%, in weight percentage, through the filter cake;
circulating pure water through the filter cake, allowing the rinsing of the cake and the elimination of the hydrofluoric acid;
obtaining a third purified slurry.

the treatment method comprises, after step c'), a step c") during which the following is carried out:
providing the second purified slurry, kept in the form of a filter cake,
circulating a dilute hydrofluoric acid solution between 0.1% and 1%, in weight percentage, through the filter cake;
circulating pure water through the filter cake, allowing the rinsing of the cake and the elimination of the hydrofluoric acid;
obtaining a third purified slurry;

the treatment method comprises a step d) of drying a purified slurry under an inert atmosphere in order to obtain purified silicon microparticles.

BRIEF DESCRIPTION OF THE DRAWINGS

Other features and advantages of the present disclosure will become clear from the following detailed description with reference to the accompanying drawings, in which.

DETAILED DESCRIPTION

Figure 1:
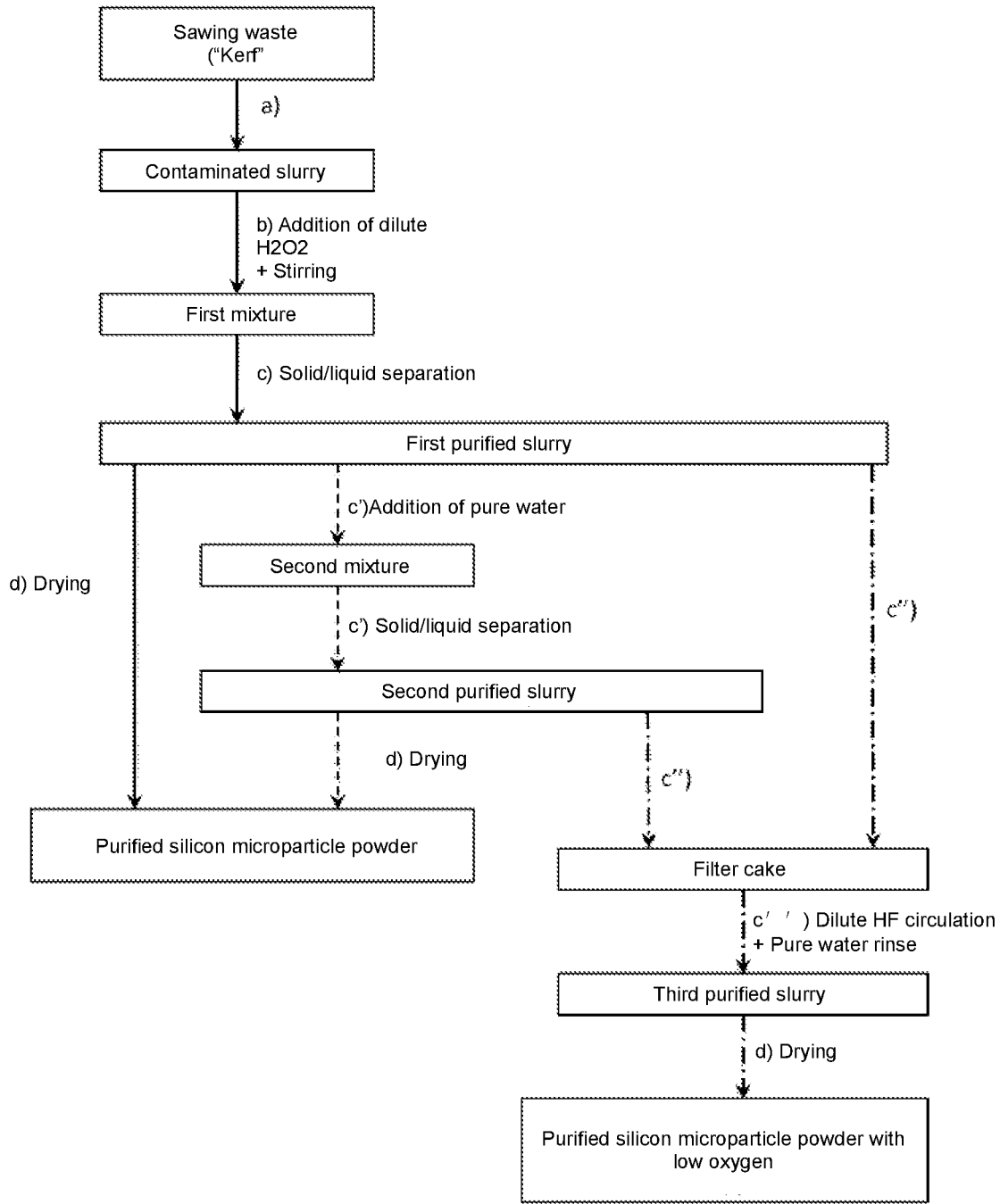
FIG. 1 shows steps of the treatment method according to the present disclosure.

The present disclosure relates to a treatment method for purifying silicon microparticles contained in waste resulting from the cutting of ingots with diamond wires, without abrasive (FIG. 1). As mentioned previously, the silicon in this waste takes the form of a very fine powder (silicon microparticles whose surface is at least partially oxidized), mixed with liquid additives, metal contaminants and organic or inorganic species. This waste essentially contains liquid matter; the weight percentage of silicon (which constitutes the majority of the solid matter) is between 2% and 5%.

The treatment method according to the present disclosure comprises a step a) of providing a contaminated slurry, resulting from sawing waste, formed by the silicon microparticles, organic species and metal contaminants in an aqueous mixture. Generally, the silicon microparticles have a size distribution between about 10 nm and 5 microns, typically centered on 1 micron.

In the remainder of the disclosure, we will use the term "slurry" to refer to a substance comprising more than 40% (weight percentage) solid matter (mainly consisting of silicon microparticles), mixed in an aqueous solution. All the proportions relating to the slurry in the present disclosure are given in weight percentages.

Advantageously, in step a), the contaminated slurry comprises approximately 50% solid matter and 50% liquid matter. The term "approximately" means here that the value of the weight percentage is at +/−10% (absolute: that is to say that a weight percentage of approximately 50% may vary between 40% and 60%), or even at +/−5% (absolute). The contaminated slurry can be obtained from cutting waste (composed essentially of liquid matter, the weight percentage of silicon being between 2% and 5%), by a known method of solid/liquid separation chosen from filtration (for example, vacuum filtration) or tangential filtration, sedimentation, centrifugation or cyclonic separation. The obtained contaminated slurry thus has more than 40% solid matter (weight percentage).

The treatment method according to the present disclosure then comprises a step b) during which a dilute hydrogen peroxide solution ($H_2O_2$) is added to the contaminated slurry, thus forming a first mixture. "Dilute solution" refers to a solution consisting of hydrogen peroxide and water. The dilute hydrogen peroxide solution may have a mass concentration of between 1% and 35% hydrogen peroxide, the additional percentage being water. Note that no other acidic or basic product is added to form the first mixture. The first mixture therefore consists of the contaminated slurry, hydrogen peroxide and water.

The respective proportions of dilute solution and contaminated slurry in the first mixture will depend on the $H_2O_2$ concentration. By way of example, for a concentration concentration of $H_2O_2$ of 35%, the first mixture preferably comprises a volume of dilute $H_2O_2$ solution for a volume of contaminated slurry; for a concentration of $H_2O_2$ of 10%, the first mixture preferably comprises three volumes of dilute solution for one volume of contaminated slurry.

Step b) also comprises stirring this first mixture, so as to homogenize the distribution of the dilute $H_2O_2$ solution in the middle of the silicon microparticles 1 and other organic species 3 or metal contaminants 4.

Figure 2:
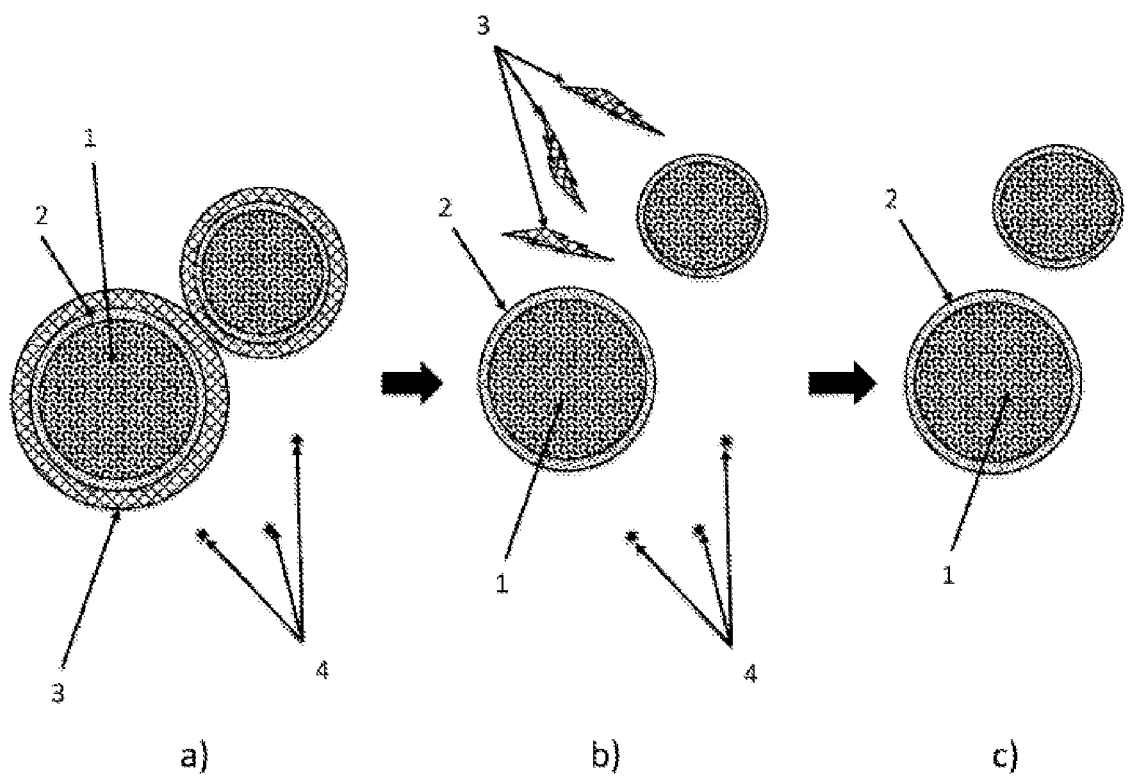
FIG. 2, Panels a) through c) present an illustration of the treatment method for the purification of silicon microparticles, in accordance with the present disclosure.

The silicon microparticles 1 resulting from the contaminated slurry mainly comprise a layer of silicon oxide 2 on their surface; moreover, they are totally or partially "covered" by layers formed by long chains of organic species 3 (FIG. 2, Panel a). The hydrogen peroxide, by an oxidation reaction of the organic species 3, will induce the segmentation of the long chains of organic species 3, which promotes their detachment from the surface of the silicon microparticles 1. As a result, the metal contaminants 4, bound to the silicon microparticles 1 via the layers of organic species 3, will also be detached (FIG. 2, Panel b). Note that this oxidation reaction also generates carbon dioxide ($CO_2$) in gaseous form.

Advantageously, the first mixture comprises approximately 5% to 10% solid matter and an additional percentage of liquid matter (in weight percentage): this liquid consistency promotes the suspension of the silicon microparticles 1 and other organic species 3 or metal contaminants 4 in the first mixture. Note that the term "approximately" is defined as stated previously.

Such a consistency of the first mixture is directly achieved when a solution with a low concentration of $H_2O_2$ is mixed with the contaminated slurry. In the case of solutions having a higher $H_2O_2$ concentration (for example, between 10 and 35%), the volume of dilute $H_2O_2$ solution added is not sufficient to reach 5% to 10% of solid matter in the first mixture; pure water is added to achieve the desired consistency of the first mixture. "Pure water" refers to deionized water or ultra-pure water, respectively having a resistivity of a few hundred kohms·cm and a resistivity greater than 18.2 Mohms·cm.

Stirring the first mixture then makes it possible to homogenize the distribution of the silicon microparticles 1 and other organic species 3 or metal contaminants 4 in suspension in the first mixture; stirring also makes it possible to increase the efficiency of the oxidation reaction segmenting the chains of organic species 3.

Step b) can be carried out at a temperature between 20° C. and 95° C., for a period ranging from 10 minutes to 5 hours.

At the end of step b), the first aqueous mixture comprises particles in homogeneous suspension, including the silicon microparticles 1, the organic species 3 mainly in the form of segmented chains and the metal contaminants 4.

The treatment method according to the present disclosure then comprises a step c) implementing a solid/liquid separation of the first mixture in order to obtain, on the one hand, a first purified slurry and, on the other hand, a first liquid loaded with organic species and metal contaminants. The first purified slurry is composed of at least 40% solid matter (FIG. 2, Panel c). The first liquid can be discharged and treated as liquid effluent.

Due to the segmentation of the organic chains, fragments of organic layers are detached from the silicon microparticles (step b)) and are, in step c), discharged with the liquid part (first liquid), due to their reduced size and/or their dissolution in water, and therefore separated from the solid material (first purified slurry).

The Applicant has been able to observe that after step c) for solid/liquid separation, at least 90% of the organic species initially present in the contaminated slurry are discharged into the first liquid. The metal contaminants (all taken together), initially present at about 1% to 3% (weight percentage) in the contaminated slurry, are also greatly reduced after this step c), in particular, because of their initial bond with the organic species.

The solid/liquid separation technique of step c) can be chosen from sedimentation, centrifugation, cyclonic separation, filtration, or other suitable known technique.

Advantageously, the treatment method comprises a rinsing step c', during which pure water is added to the first purified slurry to form a second mixture (FIG. 1). The second mixture preferably comprises at least ten volumes of water for one volume of the first slurry. Stirring is provided to homogenize the second mixture.

Step c') then comprises a solid/liquid separation of the second mixture to obtain, on the one hand, a second purified slurry and, on the other hand, a second liquid containing residual organic species and metal contaminants. The second purified slurry is composed of at least 40% solid matter. Like the first liquid, the second liquid can be discharged and treated as liquid effluent.

This second purified slurry is rinsed an additional time compared to the first slurry. It therefore has a higher level of purity: at least 95% of the organic species initially present in the contaminated slurry are eliminated after this step c'). The level of metal contaminants is also improved following this step c').

Advantageously, step c') is repeated one to five times, in order to achieve an optimum level of purity (typically a reduction of organic species and of metal contaminants by at least a factor of one hundred compared to the initial contaminated slurry), while keeping costs (generated by the reiteration of step c')) reasonable.

The treatment method according to the present disclosure advantageously comprises a step d) during which a purified slurry (the first or the second) is dried under an inert atmosphere, so as to obtain purified silicon microparticles.

Preferably, the drying is carried out under vacuum, at a temperature between 50° C. and 80° C. and with stirring. Equipment of the filter-drier type, fitted with a mechanical stirrer, could, for example, be used.

At the end of the treatment method, a very good level of purification (organic and metallic) of the silicon microparticles is achieved, typically:
Less than 0.3% (by weight) of carbon;
Less than 100 ppm (by weight) of metal contaminants (all combined).

And this without the use of highly polluting products such as bases and concentrated acids used in the methods of the state of the art.

The silicon microparticles nevertheless retain an oxide layer on their surface.

According to one variant, the treatment method according to the present disclosure comprises a step c") intended to remove all or part of the oxide present on the silicon microparticles. Step c") can be carried out after step c) or after step c') (FIG. 1).

Figure 3:
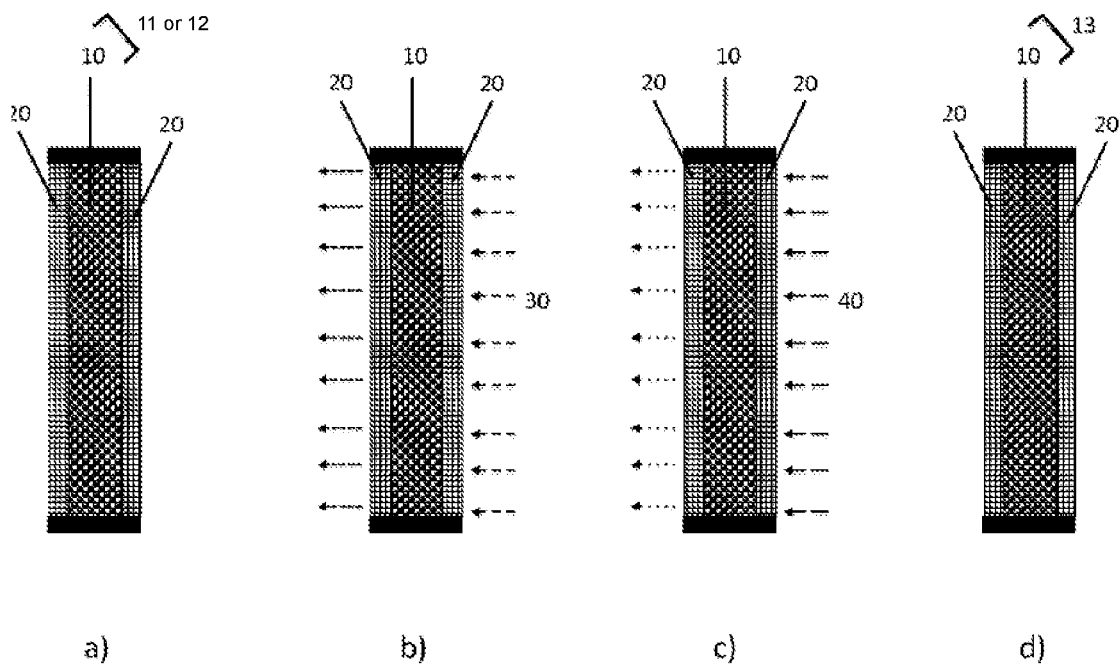
FIG. 3, Panels a) through d) show cross-sectional views of a filter cake during sequences of a step of the treatment method according to the present disclosure.

First, the treatment method comprises providing the first 11 (or the second 12) purified slurry, kept in the form of a filter cake 10 (FIG. 3, Panel a). A filter cake 10 can, in particular, be obtained after filtration under a press ("filter-press cake"): the first 11 (or the second 12) purified slurry is thus kept pressed between two porous membranes 20, assuming the form of a filter cake 10.

Step c") then comprises circulating a dilute hydrofluoric acid (HF) solution 30 between 0.1% and 1% (weight percentage) through the filter cake 10 (FIG. 3, Panel b). The HF solution 30 will thus be in contact with the silicon microparticles of the filter cake 10 and attack the oxide layer surrounding them, all along its path between the two porous membranes 20. By way of example, for one volume of filter cake 10, two volumes of 0.5% HF solution 30 will be circulated. For a lower HF concentration, a greater number of HF solution 30 volumes will be used to pass through the filter cake 10.

Then, step c") comprises circulating pure water 40 through the filter cake 10, allowing the rinsing of the filter cake 10 and the elimination of the hydrofluoric acid (FIG. 3, Panel c). In fact, the pure water 40 will circulate through the filter cake 10 by adopting more or less the same paths and interstices as the HF solution 30, thus ensuring effective rinsing of the filter cake 10. For example, for one volume of cake, ten volumes of pure water 40 will be circulated through the filter cake 10. A pH measurement at the water outlet membrane makes it possible to check the effectiveness of the rinsing: a pH value of 7 is targeted for complete rinsing.

Step c") ends with obtaining a third purified slurry 13 (FIG. 3, Panel d), composed of more than 40% solid matter. The third purified slurry 13 is formed of silicon microparticles that are mainly devoid of their surface oxide layer.

According to this variant, the treatment method advantageously comprises a drying step d) during which the third purified slurry is dried under an inert atmosphere to prevent an oxide layer from forming on the purified silicon microparticles.

The conditioning that follows this step is also carried out so as to keep the dry silicon powder in an inert, non-oxidizing atmosphere.

At the end of the treatment method according to this variant, purified silicon microparticles with a low silicon oxide content are obtained; they may have the following characteristics:

Less than 1% (by weight) oxygen,
Less than 0.3% (by weight) carbon,
Less than 50 ppm (by weight) metal contaminants (all combined); note that step c") for removing the oxide makes it possible to lower the level of metal contaminants because the latter are often integrated into the surface oxide layer covering the silicon microparticles: eliminating this layer favors therefore the elimination of metal particles.

Such characteristics make the silicon powder compatible with the majority of applications and, in particular, with the photovoltaic industry.

The treatment method according to the present disclosure allows recycling of more than 95% of the silicon contained in the form of microparticles in the sawing waste.

Of course, the present disclosure is not limited to the embodiments described and it is possible to add variants without departing from the scope of the invention as defined by the claims.

The invention claimed is:

1. A treatment method for purifying silicon microparticles contained in waste resulting from cutting ingots with diamond wires, the method comprising:
   a) providing a contaminated slurry from the waste resulting from cutting ingots with diamond wires, the contaminated slurry comprising an aqueous mixture including the silicon microparticles, organic species and metal contaminants;
   b) adding a dilute hydrogen peroxide solution to the contaminated slurry to form a first mixture consisting of the contaminated slurry, hydrogen peroxide and water, and stirring the first mixture; and
   c) performing solid/liquid separation of the first mixture in order to obtain a first purified slurry and a first liquid loaded with organic species and metal contaminants, the first purified slurry comprising less than 100 ppm by weight of metal contaminants,
   wherein no acid solution or solution other than hydrogen peroxide and water is used in steps a), b) and c).

2. The treatment method of claim 1, wherein, in step a), the contaminated slurry is obtained from the waste, by a solid/liquid separation technique chosen from sedimentation, centrifugation, cyclonic separation or filtration, and the contaminated slurry contains about 50% solid matter and 50% liquid matter, in weight percentages.

3. The treatment method of claim 2, wherein, in step b), the dilute hydrogen peroxide solution has a mass concentration of between 1% and 35%.

4. The treatment method of claim 3, wherein step b) comprises adding pure water to the first mixture, so that the first mixture comprises between 5% and 10% solid matter, in weight percentage.

5. The treatment method of claim 4, wherein step b) is carried out at a temperature between 20° C. and 95° C., for a period ranging from 10 minutes to 5 hours.

6. The treatment method of claim 5, wherein the solid/liquid separation of step c) is carried out by a technique chosen from filtration, sedimentation, centrifugation or cyclonic separation, and in which the first purified slurry comprises at least 40% solid matter, in weight percentage.

7. The treatment method of claim 6, further comprising, after step c, a step c') comprising:
   adding pure water to the first purified slurry to form a second mixture, and
   performing solid/liquid separation of the second mixture to obtain a second purified slurry and a second liquid containing organic species and metal contaminants.

8. The treatment method of claim 7, further comprising repeating step c') one to five times.

9. The treatment method of claim 6, further comprising, after step c, a step c") comprising:
   providing the first purified slurry, kept in a form of a filter cake,
   circulating a dilute hydrofluoric acid solution between 0.10% and 10%, in weight percentage, through the filter cake;
   circulating pure water through the filter cake, allowing rinsing of the filter cake and elimination of the dilute hydrofluoric acid solution; and
   obtaining a third purified slurry.

10. The treatment method of claim 9, further comprising a step d) of drying the third purified slurry under an inert atmosphere in order to obtain purified silicon microparticles.

11. The treatment method of claim 6, further comprising a step d) of drying the first purified slurry under an inert atmosphere in order to obtain purified silicon microparticles.

12. The treatment method of claim 1, wherein, in step b), the dilute hydrogen peroxide solution has a mass concentration of between 1% and 35%.

13. The treatment method of claim 1, wherein step b) comprises adding pure water to the first mixture, so that the first mixture comprises between 5% and 10% solid matter, in weight percentage.

14. The treatment method of claim 1, wherein step b) is carried out at a temperature between 20° C. and 95° C., for a period ranging from 10 minutes to 5 hours.

15. The treatment method of claim 1, wherein the solid/liquid separation of step c) is carried out by a technique chosen from filtration, sedimentation, centrifugation or cyclonic separation, and in which the first purified slurry comprises at least 40% solid matter, in weight percentage.

16. The treatment method of claim 1, further comprising, after step c, a step c') comprising:
   adding pure water to the first purified slurry to form a second mixture, and
   performing solid/liquid separation of the second mixture to obtain a second purified slurry and a second liquid containing organic species and metal contaminants.

17. The treatment method of claim 16, further comprising repeating step c') one to five times.

18. A treatment method for purifying silicon microparticles contained in waste resulting from cutting ingots with diamond wires, the method comprising:
   a) providing a contaminated slurry, resulting from the waste, comprising an aqueous mixture including the silicon microparticles, organic species and metal contaminants;
   b) adding a dilute hydrogen peroxide solution to the contaminated slurry to form a first mixture comprising the contaminated slurry, hydrogen peroxide and water, and stirring the first mixture;

c) performing solid/liquid separation of the first mixture in order to obtain a first purified slurry and a first liquid loaded with organic species and metal contaminants; and after step c, a step c") comprising:
  providing the first purified slurry, kept in a form of a filter cake,
  circulating a dilute hydrofluoric acid solution between 0.10% and 1%, in weight percentage, through the filter cake;
  circulating pure water through the filter cake, allowing rinsing of the filter cake and elimination of the dilute hydrofluoric acid solution; and
  obtaining a third purified slurry.

19. The treatment method of claim 1, further comprising a step d) of drying the first purified slurry under an inert atmosphere in order to obtain purified silicon microparticles.

20. The treatment method of claim 16, further comprising a step d) of drying the second purified slurry under an inert atmosphere in order to obtain purified silicon microparticles.

21. The treatment method of claim 18, further comprising a step d) of drying the third purified slurry under an inert atmosphere in order to obtain purified silicon microparticles.

* * * * *